July 6, 1965

E. F. MAEHL 3,192,891

FLAVOR COATING APPARATUS

Filed July 18, 1961

INVENTOR
ELMORE F. MAEHL
BY
ATTORNEY

July 6, 1965

E. F. MAEHL 3,192,891

FLAVOR COATING APPARATUS

Filed July 18, 1961

INVENTOR
ELMORE F. MAEHL

BY Hubert J. Evers
ATTORNEY

July 6, 1965 E. F. MAEHL 3,192,891
FLAVOR COATING APPARATUS
Filed July 18, 1961 11 Sheets-Sheet 6

INVENTOR.
ELMORE F. MAEHL
BY
Herbert J. Evers
ATTORNEY

July 6, 1965  E. F. MAEHL  3,192,891
FLAVOR COATING APPARATUS
Filed July 18, 1961  11 Sheets-Sheet 7

INVENTOR
ELMORE F. MAEHL
ATTORNEY

Fig. 21

INVENTOR.
ELMORE F. MAEHL

United States Patent Office 3,192,891
Patented July 6, 1965

3,192,891
FLAVOR COATING APPARATUS
Elmore F. Machl, Fanwood, N.J., assignor to National Biscuit Company, a corporation of New Jersey
Filed July 18, 1961, Ser. No. 124,877
7 Claims. (Cl. 118—16)

The present invention relates to a method and apparatus for flavor coating cones, and more particularly concerns an apparatus for flavor coating cones after they are discharged from the oven.

In the manufacture of baked goods, such as cones, a cone batter or slurry comprising molasses, flour and milk is well mixed, placed in a mold, and then heated at a relatively high temperature for a suitable period to harden the batter and produce the molded cone product. Heretofore, the coloring of such cones was performed in the batter stage by incorporating a suitable coloring material in the cone batter.

A major difficulty encountered in the production of such cones was the provision of flavoring material in the cone batter. During the baking of the cone batter in the mold, due to the high oven temperature, the flavors tended to volatilize. As a consequence, very little, if any, of the flavor was retained in the baked cone product.

The present invention has for its object the provision of apparatus for the production of flavored baked cones.

Another object of the invention is to provide a method and apparatus for incorporating flavoring ingredients in baked goods, such as cones, particularly where the flavors are normally volatilized under the heat of baking.

Other objects, features and advantages of the present invention will be apparent from the following detailed description of a preferred embodiment thereof, taken in conjunction with the drawings in which:

FIG. 8 is an enlarged sectional view of the cone drum taken along line 8—8 of FIG. 1;

FIG. 18 is an enlarged fragmentary plan view of a portion of the cone transfer arm;

FIG. 19 is a sectional view taken along line 19—19 of FIGS. 18 and 1, showing details of the vent in the cone transfer arm mechanism;

For convenience, the invention will be described in connection with the flavor coating of baked cones. However, it will be understood that the invention applies equally well to other baked goods, such as shell-type patties, as well as other edible foods which are susceptible of having at least a portion of their surfaces flavor-coated.

Figure 1:
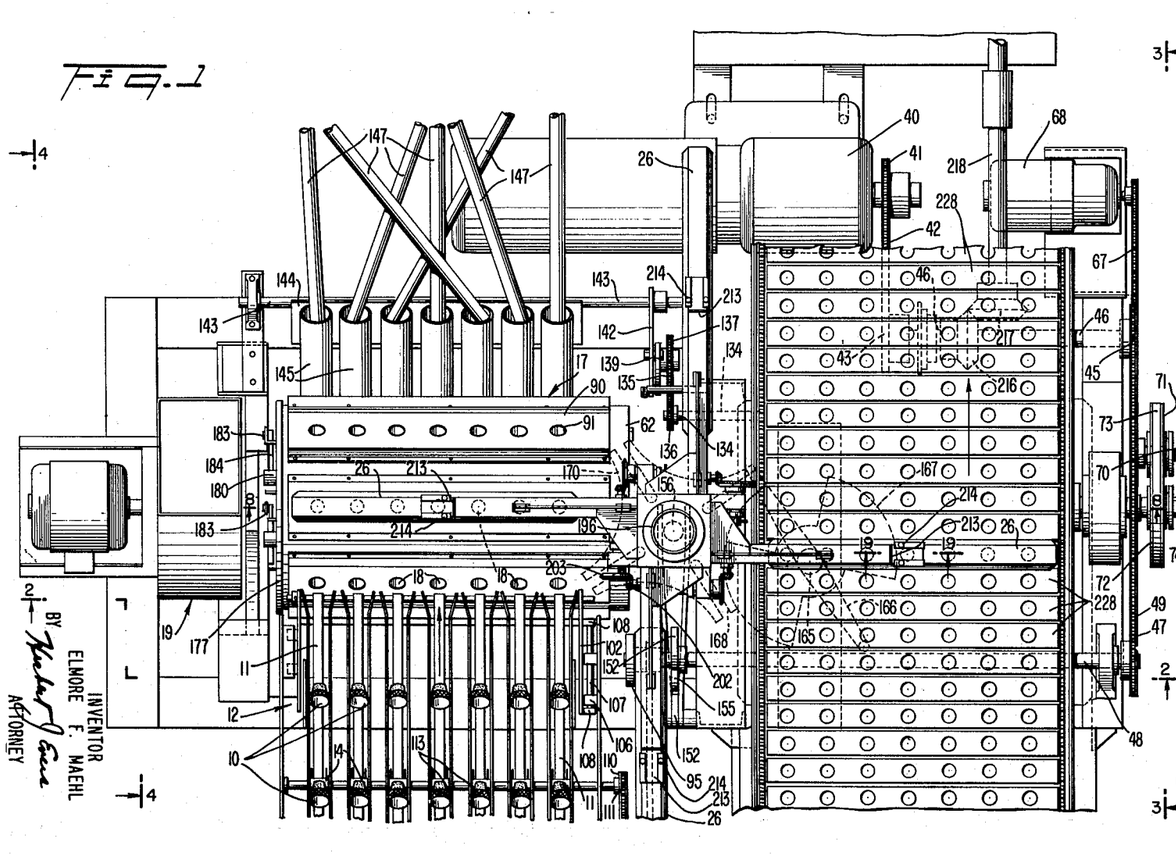
FIG. 1 is a plan view of a typical apparatus embodying the principles of the present invention.
Figure 2:
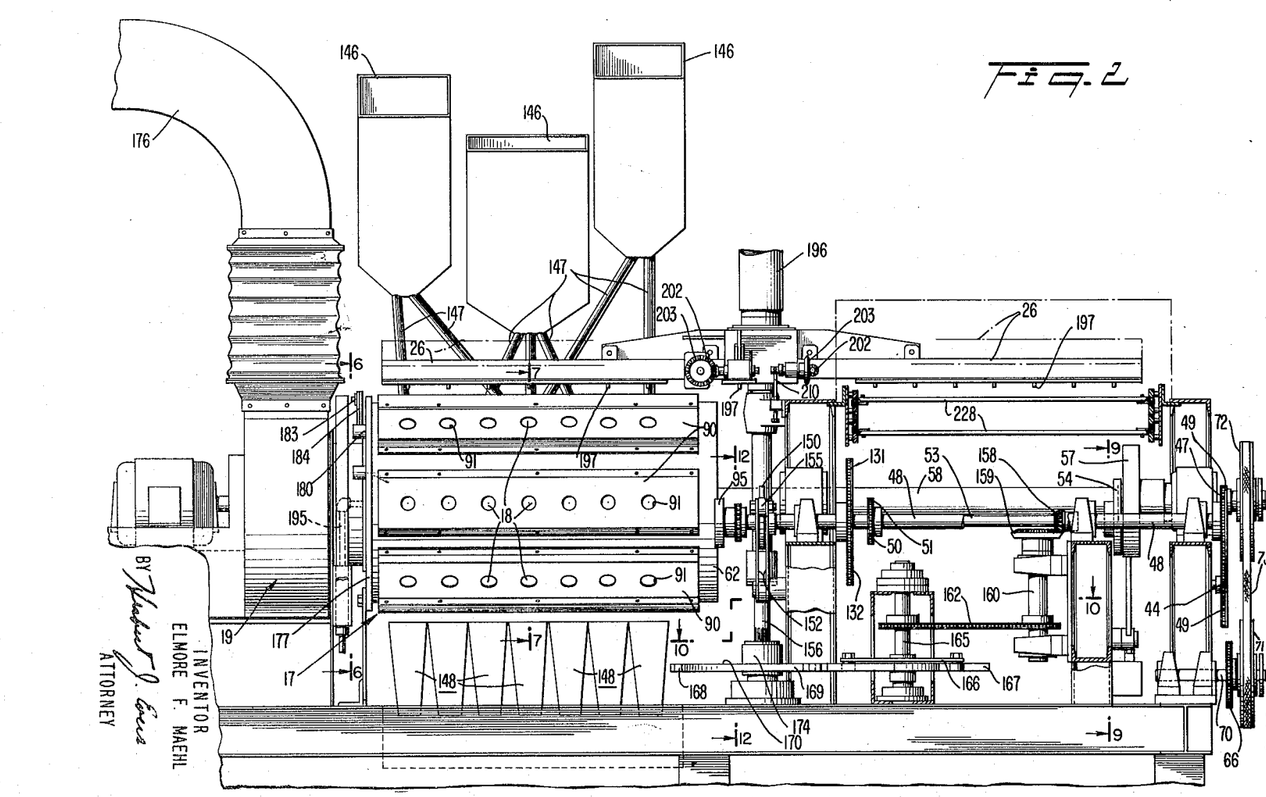
FIG. 2 is a sectional elevational view taken along line 2—2 of FIG. 1.
Figure 7:
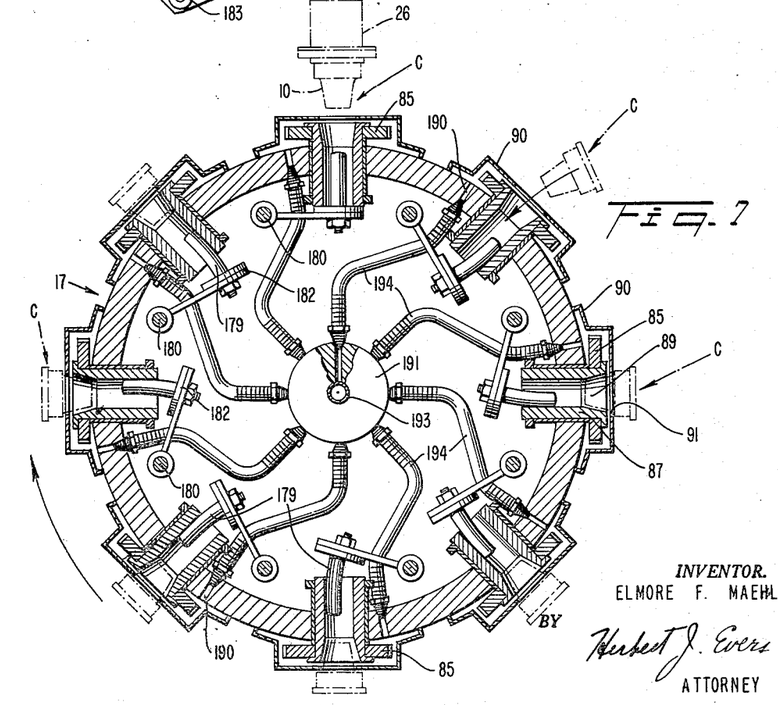
FIG. 7 is an enlarged sectional view taken along line 7—7 of FIGS. 2 and 8, showing details of the interior of the cone drum.

In accordance with the invention, a series of plurality of rows or columns of ice cream cones 10, shown in FIG. 1, supportably disposed on their sides on belts 11, are fed by a conveyor infeed assembly 12 toward a pin wheel arrester 14 (FIG. 4) which intermittently allows the leading cones from each row to be carried along in groups in substantially transverse alignment to the end of the conveyor infeed assembly 12. Included in the conveyor infeed assembly 12 is a cam driven carriage 16 which moves reciprocatingly into and out of loading engagement with a rotary turret-like cone drum 17. There, the tapered or closed ends of each group of transversely aligned cones are deposited into transversely aligned groups of receiving sockets 18 positioned about the periphery of the cone drum 17 where they are seated and held in place by a suction mechanism 19. The number of each group of transversely aligned sockets 18 corresponds to the number of transversely aligned groups of cones fed to it. The deposited cones 10, with their outer rim walls 10a exposed above the face of the cone drum 17, see FIG. 7, are individually, continuously rotated by a cone turning drive 81. The entire drum 17 is intermittently driven by a cone drum drive 22, see FIG. 8, to a plurality of stations where a plurality of sequential steps are performed. These stations comprise a spraying station 23, FIG. 4, where a light coating of a suitable adhesive is applied to the exposed cone surface, a flavor application station 24, FIG. 4, where flavoring is applied over the adhesive bearing surface, and finally a stripping station 25, FIG. 8, where the flavor coated cones are ejected onto a transfer arm 26 and transported to a drying conveyor 27, FIG. 1. The flavor application station 24 includes a flavor dispenser 31 which is activated at the right time, by means of a flavor camming mechanism 32, over a group of cones to provide the flavor coating.

*Power drive—Cone drum assembly*

Figure 3:
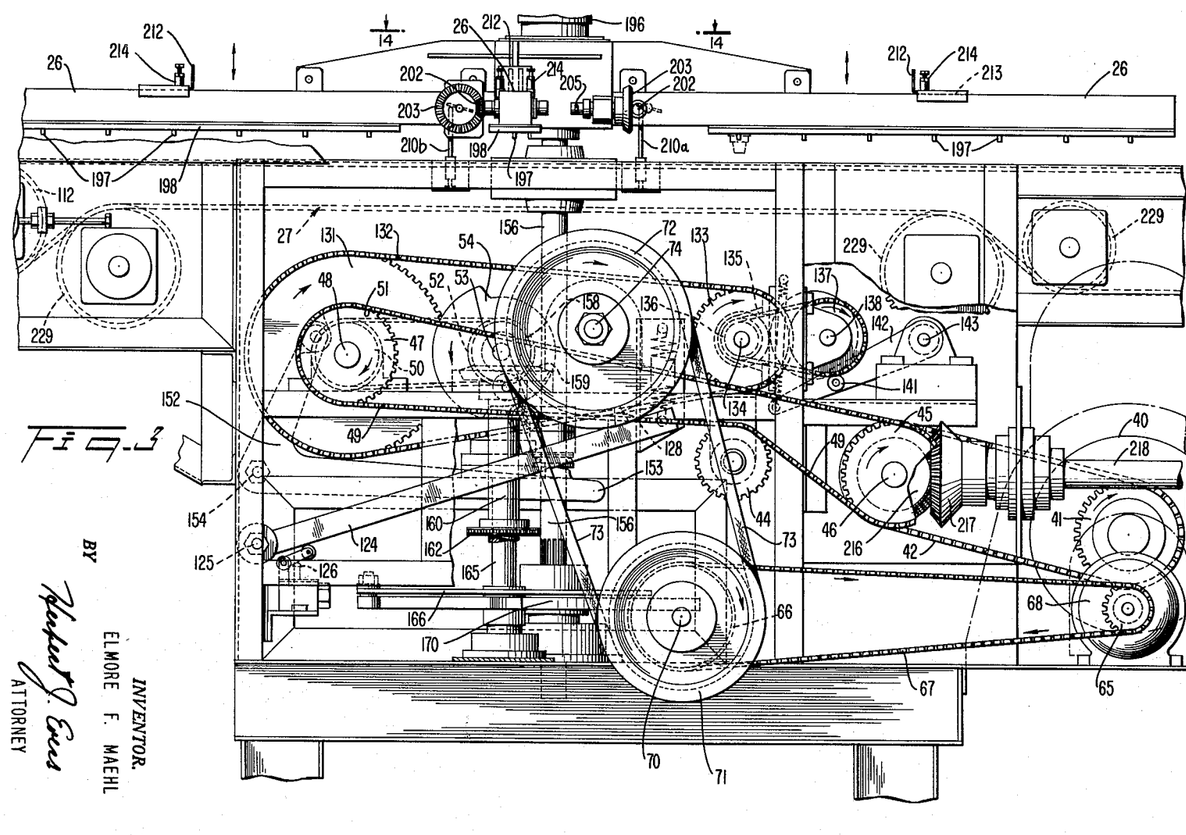
FIG. 3 is an enlarged side view of the apparatus shown in FIG. 1, as viewed along line 3—3 of FIG. 1.

FIGURES 1 through 5 show how the various assemblies, such as the conveyor carriage or infeed assembly 12, the cone drum assembly 17, the cone turning assembly 21, and the sugar or flavor dispensing assembly 24 are all driven from the sources of power. Referring to FIGS. 1 and 3, a motor 40 drives a sprocket 41 which is connected by means of a chain 42 to sprocket 43 mounted on one end of a rotatable shaft 46. A sprocket 45, mounted on the opposite end of the shaft 46, drives a sprocket wheel 47 mounted on rotating shaft 48 by means of a chain 49. Idler sprocket 44 provides the proper tension in the chain 49. Keyed to the shaft 48 is a sprocket, 50, see FIG. 5, which is connected by means of a chain 51 to a sprocket wheel 52 rotatably driving a shaft 53 secured thereto. This shaft 53 has mounted on it a drive plate 54 provided with a projecting tooth 55, see FIG. 9 on one face thereof which gears with equally spaced radial slots 56 in a driven disc 57 mounted on a hollow arbor or spindle 58. As shown in FIG. 8, the arbor 58 is tapered at its end 60 to fit into a complementally tapered opening 61 in the end wall 62 of the cone drum 17 so that the extremity of the arbor end 60 projects a sufficient distance into the interior of the cone drum for the provision of external threading for the reception of a threaded retaining nut 63 thereon. In this manner the arbor 58 constitutes the drive shaft for the cone drum 17. During the period in which the continuously rotating drive plate 54 has its projecting tooth in mesh with one of the radial slots 56 in the driven disc 57, the cone drum 17 is driven through a sector equal to the angular spacing between such slots. When the continuously rotating drive plate 54 is out of mesh with the driven disc 57, the cone drum 17 is stationary. Thereby, the cone drum is intermittently rotated from a continuously rotating source of power.

*Cone turning gear drive*

Referring to FIGS. 1 and 3, a sprocket wheel 65 and a pulley drive sprocket 66, connected by a chain 67, are driven by a motor 68. The pulley drive sprocket 66 is secured to the same shaft 70 as a driver pulley 71, and is connected in driving relation to a pulley 72 by a pulley belt 73 around said pulleys 71, 72. The pulley 72 is positioned at one end of an elongated gear train drive shaft 74 from which the cone turning gear drive 21 is driven.

Figure 5:
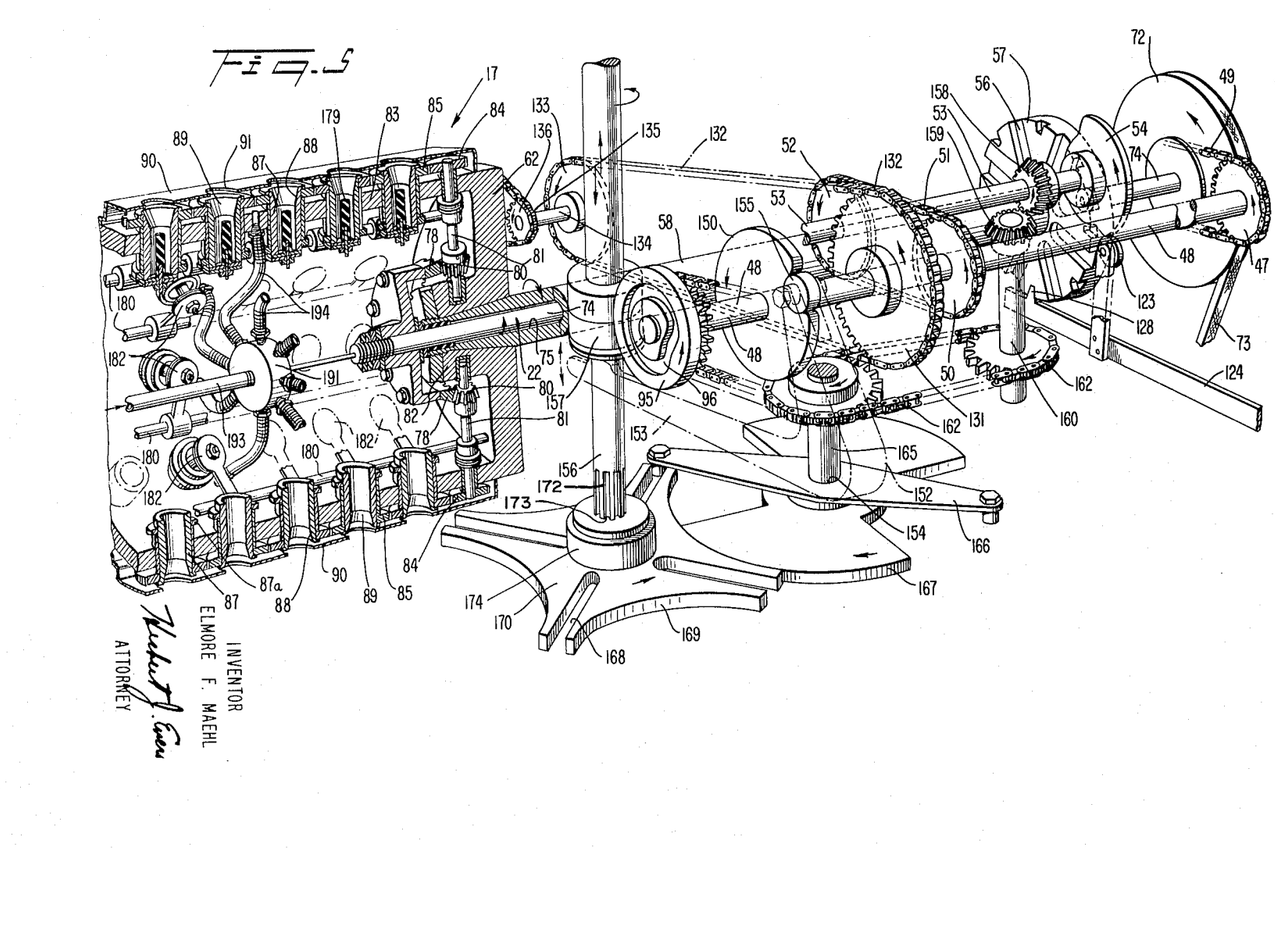
FIG. 5 is an enlarged fragmentary view in perspective of a portion of the gearing mechanism employed in the apparatus shown in FIG. 1.
Figures 9, 11:
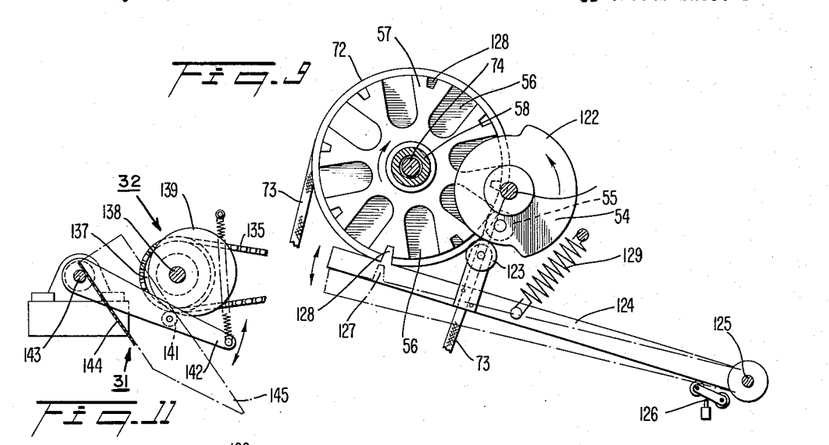
FIG. 9 is an enlarged sectional view of a Geneva drive mechanism employed in the practice of the invention, taken along line 9—9 of FIG. 2.
FIG. 11 is a side elevational view of the camming mechanism for the sugar spout.

As best seen in FIGS. 5, 8 and 9, with particular reference to FIG. 8, the drive shaft 74 on which the pulley 72 is mounted extends through the center or bore 75 of the drum drive spindle 58, being supported adjacent its ends by a thrust bearing 76 and a support bearing 77. The clearance space between the bore 75 and the drive shaft 74 may be filled with oil by providing a suitable grease cup, if so desired. A crown gear or bevel spider drive gear 78 is secured to the end of the drive shaft 74 and is disposed in meshing engagement with a plurality of uniformly circumferentially spaced bevel gears 80 mounted respectively on spindles 81. Each of the spindles 81 is supportably mounted at one end in the hub 82 of the cone drum 17 and extends radially outwardly through the cone drum wall 83. The end of each spindle 81 is capped with a gear 84 which drives a gear train composed of a series of cone-turning gears 85, seven gears being shown and illustrated in the drawings. In assembly, the bevel drive gear 78 appears as a ring gear driving a plurality of circumferentially spaced bevel pinion gears 80, there being provision for 8 such pinion gears 80 in the particular embodiment shown in the drawings, although a larger or a smaller number may be used, if so desired.

Each gear 85 is mounted on an open-ended socket 87 having a tapered cone-receiving entrance 88 adapted to loosely receive the tapered side wall or closed end 89 of a cone C. The socket 87 passes loosely through a tubular wall or jacket 86 affixed to the cone wall 83, which together with a retaining ring 87a and a retaining lip 87b as opposite ends of the socket 87 serve to permit rotation of the gear and socket, 85, 87, in fixed relation to the cone drum wall 83. Each train of gears 85 has a protective cover 90 in respective registry with the socket entrances 88 and so dimensioned as to provide a supporting surface for the nesting cone rim wall 92 of the cone C. As will be explained hereinafter, the cones C are retained in the sockets 87 by suitable suction apparatus, and are rotated therewith by the cone-turning gear drive 21, while the flavor coating operation is being performed.

*Conveyor infeed—Reciprocating carriage drive*

Figure 4:
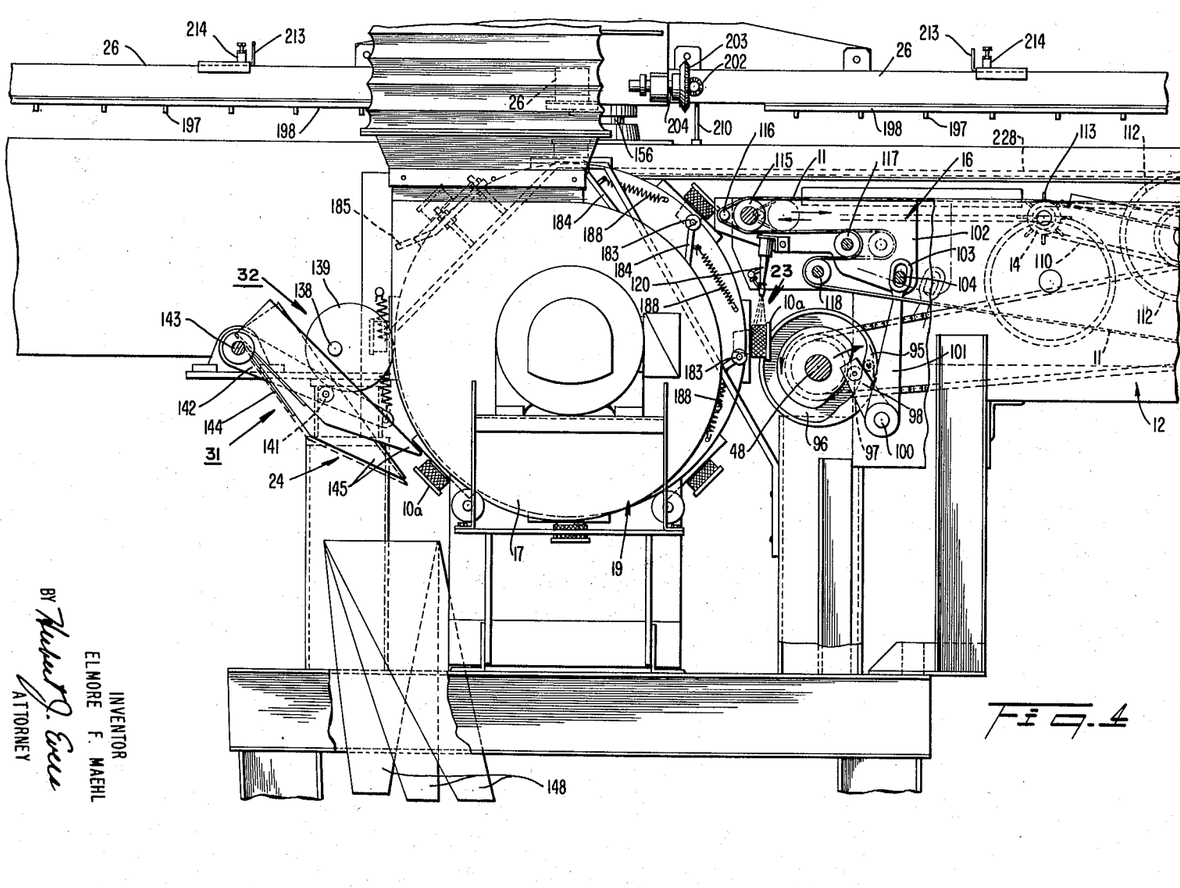
FIG. 4 is an enlarged side view of the apparatus shown in FIG. 1, as viewed along line 4—4 of FIG. 1.

The reciprocation of the carriage 16 at the head of the conveyor infeed assembly is accomplished by a camming mechanism in which the intermittent advance and hold period of the carriage is approximately coincident with the interval during which the cone drum 17 is stationary, and the return of the carriage is approximately coincident with the unit motion period during which the cone drum is rotatably moved to its next station. The camming mechanism for reciprocating the carriage 16 comprises a face cam 95 driven from the shaft 48. As best seen in FIG. 4, the face cam 95 is provided with a recessed cam track or groove 96 for the travel therein of a cam follower pin 97 disposed at the end of a link 98. This link 98 is mounted on a rotatable shaft 100 having a fixed axis, which carries upon it at one end thereof one or more handles 101, one being illustrated herein, so that the shaft 100 and handle 101 may be rocked as a unit about the axis of the shaft 100 by virtue of the movement of the pin 97 in the cam track 96. The carriage 16 is provided with a pair of depending side walls 102, one of the side walls having a vertical enclosed slot 103 for receiving therein a pusher pin 104 at the end of the handle 101. The side walls 102 are provided with suitable guide means to preserve the attitude of the carriage during reciprocation thereof. Such guide means may comprise space eye brackets 106, see FIG. 1, mounted in the frame of the conveyor infeed to slidingly accommodate therethrough a longitudinal bolt or slide shaft 107 secured by stop bars 108 to the carriage wall 102. It will thus be seen in FIG. 4 that when the cam follower 97 moves to the dotted outline position, it likewise moves the handle 101 to its dotted outline position. Thereby the pusher pin 104 retracts the carriage 16. During retraction the guide bolts 107 slide in brackets 106 so that the carriage 16 moves in the horizontal plane of the slide shaft 107 rather than along the arcuate path of the pusher pin 104, there being sufficient clearance in the slot 103 to accommodate such movement without interference with the oscillating path of the pin 104 therein.

The coordination of the feeding of cones to the cone drum 17 is accomplished by means of the pin wheel arrester 14 shown in FIG. 4, the number of pin wheels corresponding to the number of rows of cones being fed to the cone drum 17. In the present instance seven pin wheels are mounted on the same axis. Each pin wheel 14 derives its motivation from a chain drive 110 entrained about a sprocket wheel 111 on the same shaft as the tail sprocket 112 of the drying conveyor 27, which in turn is intermittently driven in synchronization with the movement of the cone drum 17 as will be later explained. Consequently, the pin wheel arrester 14 is similarly intermittently driven. The top-most spoke 113 of the pin wheel 14 projects above the plane of the belt 11 and fits in the space defined by the juncture of the cone side wall 89 and the cone rim 92. Upon the intermittent rotation of the pin wheel 14, the top-most spoke 113 recedes to allow the advance of the leading cone and the next spoke comes into position to retard the succeeding cone until the proper time for release.

In order to permit reciprocation of the carriage 16 without producing slack in the belt 11, the feed belt 11, at its head end, moves around a pair of pulleys 115, 116, mounted in the movable carriage 16, reverses around a pulley 117 also mounted in said carriage, and then passes around a fixed end pulley 118 mounted in the frame of the machine. Any slack that is normally occasioned by the retraction of the rollers 115 and 116 in carriage 16 to the dotted outline position shown in FIG. 4 is thereby automatically compensated for by the corresponding retracting of roller 117 therein to the dotted position shown.

Spray station

Fixed to the carriage 16 are a number of spray guns 120 for spraying the cones in the cone drum with adhesive material when such cones are at the spray station. FIG. 4 clearly shows the sprays 120 mounted in the underside of the carriage 16 in the act of spraying the cones at the spraying station. This operation occurs during the forward dwell period of the carriage 16 coincident with the period when the drum 17 is stationary.

Time of the spraying operation in synchronization with the pauses in the rotation of the drum 17 may be accomplished in the present invention in the following manner, although other suitable means may be used if so desired. FIG. 9 illustrates the Geneva drive mechanism for intermittently driving the cone drum arbor 58, the Geneva drive comprising the drive plate 54 and the radially slotted driven disc 57. The drive plate 54 includes a cam surface 122 which moves a cam follower 123 mounted on an elongated bar 124 which pivots about an axis 125. At a point adjacent the axis 125, the bar 124 is operatively connected to a microswitch 126 for activating the gang of spray guns 120 in carriage 16. During the period the drive plate tooth 55 is out of engagement with the slots 52, the cone drum arbor 58 and the cone drum 17 are stationary and the switch actuating bar 124 is in the operative position shown in solid outline form in FIG. 9. Since during this period, the cones are constantly rotated by the drive shaft 74 running through the hollow center 75 of the drum drive spindle, there is a tendency for the hollow arbor 58 to creep and thus move the cone drum 17 out of position. To avoid this possibility the bar 124 is provided with a stop pin 127 adapted to fit in a complementary recess 128 in the periphery of the driven disc 57 during the portion of the time when the cone drum 17 is stationary. Eight equally spaced recesses 128 are illustrated in FIG. 9 corresponding to the eight positions assumed by cone drum 17 during its intermittent rotation. A spring 129 serves to retain the follower 123 in engagement with its associated camming surface 122.

Power drive—Oscillating sugar dispensing mechanism

Referring principally to FIGS. 3 and 5, a sprocket wheel 131 on the shaft 48 is connected by means of a chain 132 to a sprocket 133 on a shaft 134, and thereby drives a chain drive 135 from a second sprocket wheel 136 on the shaft 134. As best seen in FIG. 3, the chain drive 135 passes around a driven sprocket wheel 137 rotatably mounted on a shaft 138 which drives a sugar dispenser cam 139. From FIGS. 1 and 11, it will be seen that rotation of the cam 139 moves a cam follower 141 mounted on a spring-biased lever 142 which oscillatably pivots about axis 143, see FIG. 11. This axis 143 has suitably secured to it, as by welding, a plate 144 on which is mounted a plurality of sugar dispensing spouts 145 in receiving relation to a sugar source or hopper 146 (FIG. 2) via connecting tubes 147. As illustrated in the drawings, seven spouts 145 are provided, corresponding respectively with the seven cone sockets 18 in each row in the cone drum 17, although any desirable number of spouts may be employed.

The socketed cones in the cone drum 17 are intermittently advanced from station to station along the periphery of the cone drum as will be apparent from the previous description, and each row of cones moves one by one to the sugar dispensing station. As clearly shown in FIG. 4, as a row of cones approaches the sugar dispensing station, the several sugar dispensers 145 travel inwardly toward the cone drum by virtue of the action of cam 139 and arrive directly over the row of cones to feed sugar or other flavoring material over the constantly rotating cone rim walls of the socketed cones. The flavoring particles fall by gravity from the dispenser 145 and adhere to the exposed cone drum walls which are constantly turning. The flavoring particles that do not stick to the cone walls may be collected in collecting troughs 148 where they may be recovered or returned to the supply hoppers 146 by any suitable means. Thereafter, the dispensers 145 start to recede from the solid outline position shown in FIG. 4 to the dotted outline position. By the time the dispensers 145 are clear of the path of travel, the cone drum is able to freely move the flavor coated cones to the next station. Thus the advancing and receding of the dispensers 145 are cam actuated in synchronization with the dwell and rotary movements of the cone drum 17.

In the practice of the present invention, one or more flavors may be simultaneously applied to a row of cones. In the arrangement illustrated in FIG. 2, three different varieties of flavor may be used, the central hopper supplying a flavoring material to three cones via the three connecting tubes 147 emanating therefrom and the remaining hoppers each supplying a flavoring material to a pair of cones.

Cone transfer arm drive

The construction and operation of the cone transfer arm 26 are illustrated in FIGS. 3 and 5. Referring to FIG. 5, a cam 150 on rotating shaft 48 operates a V-shaped lever having arms 152, 153 supported at their juncture by a pivot axis 154. The arm 152 has attached to its end a cam follower 155 adapted to follow the contour of the cam 150 and thus oscillate said arm 152 and push said arm 153 up and down about the pivot axis 154. Preferably the end of the arm 153 is in the form of a yoke which straddles a vertical transfer arm drive post 156 and transportably raises and lowers said drive post 156 by engagement with the underside of a collar 157 mounted thereon. Every time the follower 155 moves within the depression area of the cam 150, the drive post 156 is restored to its low position. The follower 155 is kept in engagement with the cam 150 at all times by the weight of the drive post 156 on the lever 153.

Referring now in more detail to FIG. 3, the transfer arm 26 is secured to the top of the drive post 156 and extends horizontally outwardly immediately above the cone drum 17 but clear thereof. Any number of transfer arms 26 may be provided, four being shown and illustrated in FIG. 14.

The general scheme of operation of the transfer arms 26 is as follows. Each time a row of flavor coated cones in the cone drum 17 reaches the topmost position, the transfer arms 26 descend, lift the row of coated cones and then rotate about the axis of the drive post 156 for transfer of the cones to the drying conveyor 27 which subsequently conveys the cones through a drying oven (not shown). Thereafter, the arms 26 travel around the axis of the drive post 156 to repeat their cycle of operation.

Figure 10:
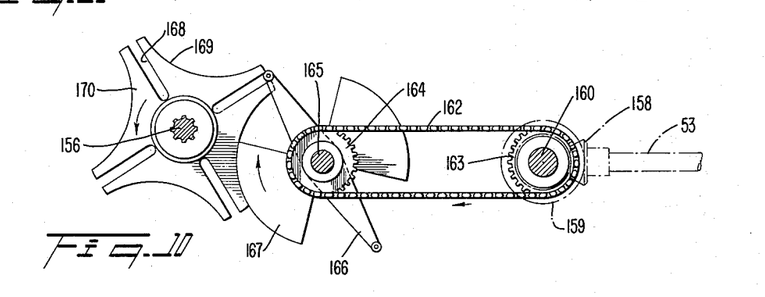
FIG. 10 is an enlargement of a sectional view of another Geneva drive mechanism, taken along line 10—10 of FIG. 2.

The drive post 156 is operatively connected to the shaft 53 by a bevel gear 158 on shaft 53 which meshes with a mating bevel gear 159 on a vertical shaft 160. FIG. 10 shows a continuation of the drive train in order to more clearly illustrate the drive mechanism. As seen in FIG. 10, a chain 162 rotates around a sprocket 163 mounted on the vertical shaft 160 and around a sprocket 164 on a stub shaft 165. Also pinned to the stub shaft 165 on its lower extended end is a toothed part 166 and a smooth or idle sector part 167 for meshing engagement respectively with a slot 168 and arcuate section 169 in a Geneva type drive plate 170 fixed to the drive post 156. As will be understood by reference to FIG. 5, the transfer arms 26, which are connected to the drive post 156, are also connected by means of the Geneva gears, 166–167–170, so that the transfer arm 26 will progress around its path in intermittent or periodic movement in synchronization with the intermittent rotation of the cone drum 17.

Figures 12, 13:
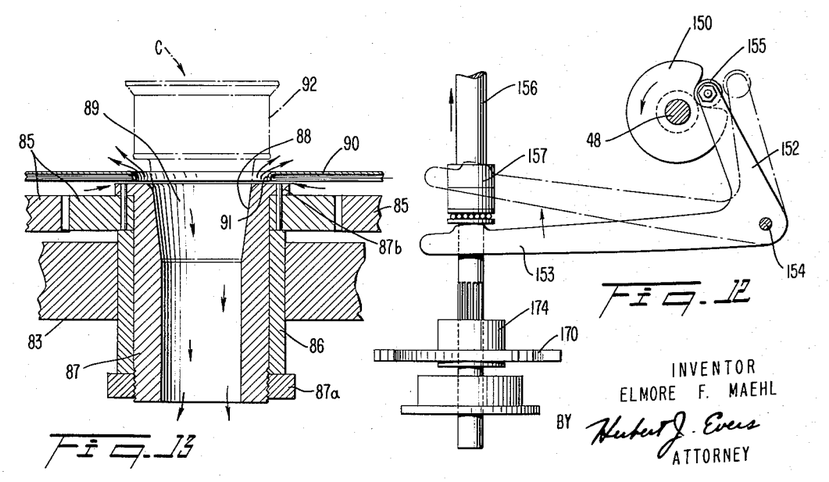
FIG. 12 is an enlarged sectional view of the camming mechanism for the vertical reciprocation of the cone transferring arms 26, taken along line 12—12 of FIG. 2.
FIG. 13 is an enlarged sectional view of a cone receiving socket in the cone drum.

In order that the transfer arm carrying post 156 may be intermittently driven in the raised or lowered position by the Geneva drive parts 166–167, the shaft 156 is provided at its lower end with longitudinal splines or grooves 172 fitting into and longitudinally slidable within internal grooves or slots in the hub 174 of the Geneva plate 170, see FIG. 12. In this manner, positive drive to the drive post 156 is available from the shaft 53 at all times, independently of the vertical position of the drive post 156 relative to the Geneva plate 170.

Cone drum

In the conveying of the cones in the sockets of the cone drum 17, means are provided to prevent dislodgement of the cones during their travel. Accordingly, a vacuum pump (not shown) is suitably connected by a vacuum conduit 176, see FIG. 2, to an end plate 177 on the cone drum in communication with the inside of the cone drum. By referring to FIGS. 5 and 7 it will be seen that as each row of cones is deposited in its respective sockets 91, the cones are gently yet firmly seated in place. Thus, as the bottom conical surfaces of the cones C contact the inner walls of their respective sockets 91, a circumferential seal is formed which establishes a vacuum in the lower portion of the sockets 91. The vacuum creates a differential pressure between the outer surface of the cones and the inner surface of the sockets thereby creating a holding effect upon the cones.

Upon completion of the flavor coating operation, the coated cones are drawn off the cone drum 17, as will be apparent from the previous description, and are then moved to the drying conveyor 27. It has been found desirable to suitably release the coated cones from their retaining sockets prior to their coming under the control of the transfer arm 26. This is accomplished in the present invention by an ejecting mechanism comprising a group of plungers 179 arranged on a rock shaft 180 mounted in the end walls of the cone drum 17 so as to act together. A group of such plungers 179 is provided for each transverse row of cone sockets 91, and is spaced and constructed to be projected upwards in its associated socket a predetermined distance so as to eject the cones from the affected cone sockets. Thus, rotation of the rock shaft 180 affects the positions of all the plungers 179 of that section. Simultaneously with the ejection of the cones, each of the tubular sockets so affected are engaged at their inside lips with a closure flange 182 disposed between plungers 179 and the rock shaft 180 in order to maintain sufficient vacuum conditions inside the cone drum. This serves to retain the cones in those sockets which are not undergoing ejection while the topmost cones are in the process of ejection and removal. It is thus seen that the structure hereinbefore described (plungers 179) provides a means for breaking the vacuum seals formed about the cone surfaces and the adjacent walls of their respective sockets 91.

Figure 6:
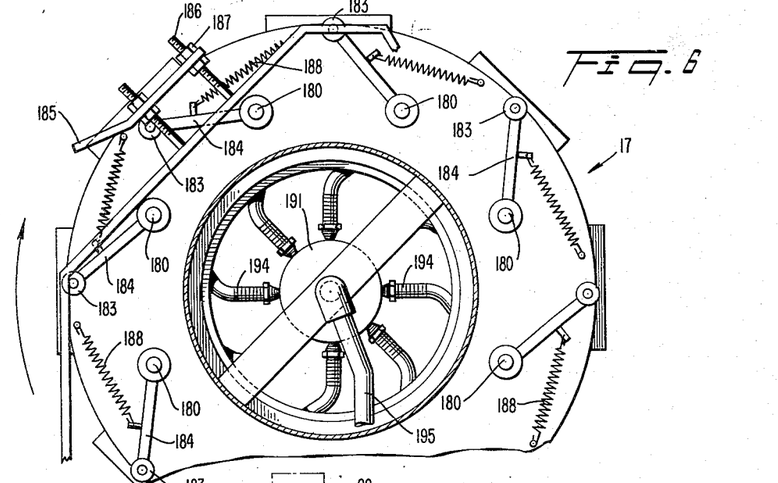
FIG. 6 is an enlarged sectional view of the cone drum of the invention taken along line 6—6 of FIG. 2.

A roller 183, see FIG. 6, on the end of a lever 184 projecting from each of the rock shafts 180 is adapted to engage a stationary cam 185 at the proper time and thus simultaneously rotate the rock shaft 180, the plungers 179 and the closure flanges 182. Cam 185 is in effect a combination of a depth-setting or measuring cam that determines the distance the plungers 179 project into the socket 91 in order for the closure flange 182 to engage the cone socket, and a timing cam that discharges the contents of the sockets 91 as they approach the vicinity of the transfer arm 26. Referring to FIGS. 6 and 7, it will be seen that the cam 185 is positioned on a stationary framework with respect to the rotating drum 17 so that it engages and actuates cam roller 183 just prior to the time that the affected socket 91 reaches its topmost position. For adjustment purposes the cam 185 is adjustably secured to threaded studs 186 by means of bolts 187. Other style cams may be used if so desired.

During the travel of the cone drum sockets 91, between the removal of the coated cones and the insertion of uncoated cones, the plungers 179 are withdrawn to their most inward position by a suitable means, such as coil springs 188 which urge the plungers out of the sockets 91.

By referring to the enlarged socket detail shown in FIG. 13, it will be seen that there is a tendency for foreign matter, such as sugar particles, to enter into the cone drum 17 due to the suction conditions that prevail therein, and particularly into the space beneath the protective cover 90. If sufficient particles enter into this space, they tend to interfere with the proper operation of the cone turning gears 85. For this purpose there is provided a positive air flow through an opening 190 (see FIG. 7) in the cone drum wall 83 through which a positive air feed pressure can be supplied into the cone turning gear space to prevent the ingress of sugar particles. This is accomplished by a means of a Chicksan type conventional air valve 191 having a rotating element which is supported by a rod 192 (see FIG. 8) extending from the gear train drive shaft 74 and a stationary element which is supported by a fixed tubular air infeed pipe 193. Radially spaced about the air valve 191 are a plurality of openings having connected thereto hoses 194 which provide communication between the inside of the cover 90 and the air infeed pipe 193.

In operation, the rotary element of the rotating valve 191, including the hoses 194, rotates with the cone drum 17 and the supporting rod 192, while the air infeed pipe 193 remains stationary. Air is supplied into the air infeed pipe 193 by an air supply pipe 195 shown in FIG. 6 passing through an opening in the side wall of the cone drum 17, and passes through the pipe into the air valve and out the hose communications into the cone turning gear space. In this fashion, as the cone drum rotates, a positive flow of air is continually supplied to the gear space to prevent the accumulation of foreign matter therein while suction conditions generally prevail throughout the remainder of the inside of the cone drum 17 including the socket 87.

Transfer arm construction

The transfer arm 26 comprises a plurality of arms, four arms which are disposed at 90° to each other being illustrated herein, each arm being, in effect, a sleeve in the form of an elongated tubular manifold or sealed chamber of generally rectangular cross section which may be evacuated from the center thereof through a port opening 196 by suitable pump means (not shown). Outwardly projecting tubular openings 197, corresponding in number and spacing to the cone drum openings 91 in each transverse row of the cone drum 17, are provided along the length of each transfer arm 26 to enable the suction lifting of flavor coated cones from said cone drum 17. The cones are held by suction against a cushion or pad 198, made of foam rubber or the like, attached to underside of the transfer arm 26. The pump means for evacuating each chamber in each of the transfer arms 26 through the opening 196 is of suitable capacity to enable the picking up of any number of cones from the cone drum 17 even when some of the sockets in the cone drum may not have a cone therein.

The flavor coated cones that are lifted by the transfer mechanism 26 are carried through two successive 90° cycles. The first 90° cycle allows the next succeeding arm 26 to come into proper position to perform its cone pick-up function. The second 90° cycle enables the transfer arm 26 to be carried to a position directly over the drying conveyor 27 in the manner illustrated in FIG. 1. Thereafter, the transfer arm 26 travels through two 90° return cycles to bring it back into cone pick-up position with respect to the cone drum 17.

As previously described, the transfer arms 26 are mounted on the post 156 which is intermittently rotated by the Geneva drive plate 170. Each time there is a pause in the rotation of the drive plate 170, each transfer arm 26 has completed a 90° cycle and a new transfer arm is in suction lifting position over the cone drum 17, the tubular openings 197 being in responsive registry with the uppermost transverse row of spaced openings 91 in the cone drum 17. At this time, the drive post 156 supporting the entire transfer arm assembly is quickly lowered by the pivot arms 153 to thereby move the transfer arm 26 into close proximity with the cone drum 17 to suction-lift the cone therefrom, and then raised. It will be seen in FIGS. 5 and 12 that during the vertical reciprocation of the post 156, the grooves 173 in hub 174 will ride along the ridges of the spline 172 without affecting the drive relationship between the plate 170 and the post 156. Thereupon the transfer arm 26 is rotated 90° by the drive plate 170 and the cone drum 17 is simultaneously rotatively driven until the next row of cones in the cone drum is in registry with the succeeding transfer arm.

The release of the cones from the cone transfer arm 26 to the drying conveyor 27 is accomplished by a butterfly valve 200, closure of which at the proper time shuts off communication between the interior of the transfer arm 26 and port 196. The butterfly valve 200 is mounted on a pivotably oscillatable pinion shaft 201 extending transversely through the transfer arm 26 and having on one end thereof a bevel pinion 202 in mesh with a bevel gear 203. The bevel gear 203 is secured to one end of a rotatable stem 204 having a pair of oppositely, radially extending projections 205. The opposite end of the pinion shaft 201 is provided with a lateral locking arm 206 adapted to be retainably held by either of spring clips 207, 208, corresponding respectively to the open and closed positions of the butterfly 200. The above described butterfly valve 200 and associated mechanism is entirely supported by the transfer arm assembly.

Figures 14, 16, 17:
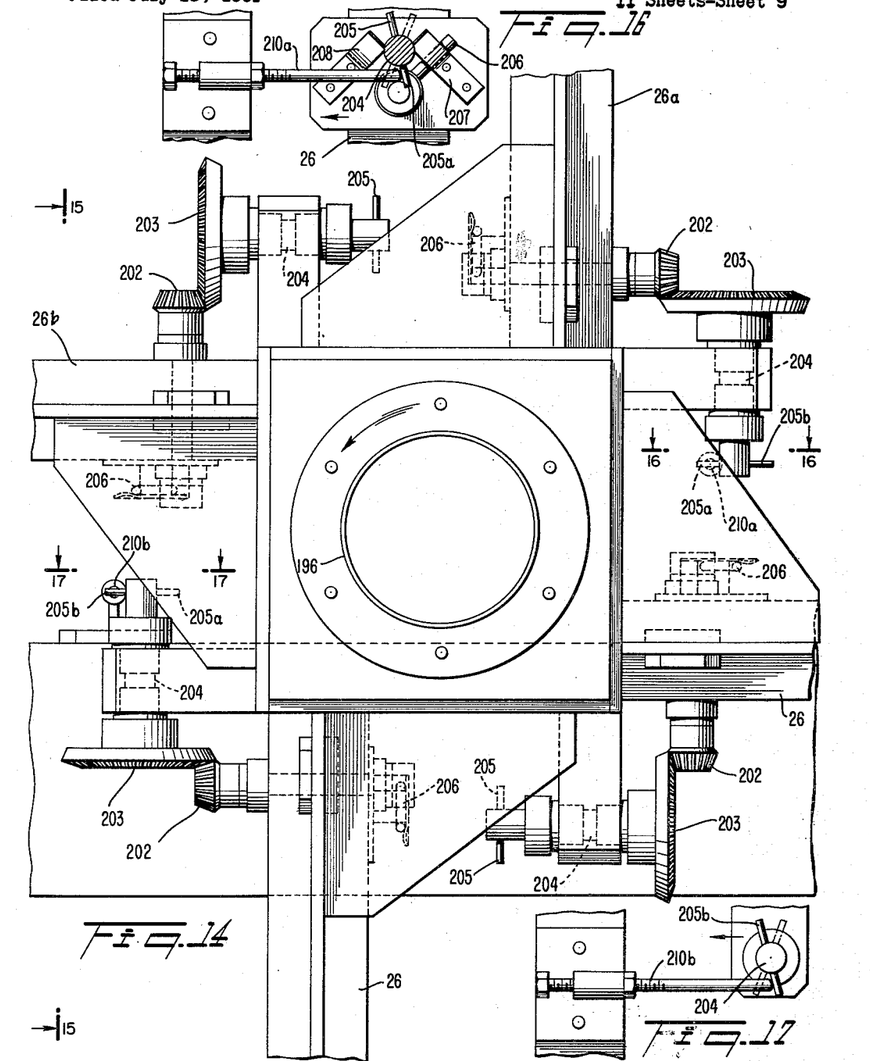
FIG. 14 is an enlarged fragmentary plan view of the cone transferring mechanism of the invention, viewed along line 14—14 of FIG. 3.
FIG. 16 is an enlarged sectional view taken along line 16—16 of FIG. 14, showing additional details of the operation of the butterfly valve for the cone transferring mechanism.
FIG. 17 is an enlarged sectional view taken along line 17—17 of FIG. 14, showing further details of the operation of the butterfly valve for the cone transferring mechanism.
Figures 15, 16, 17, 20:
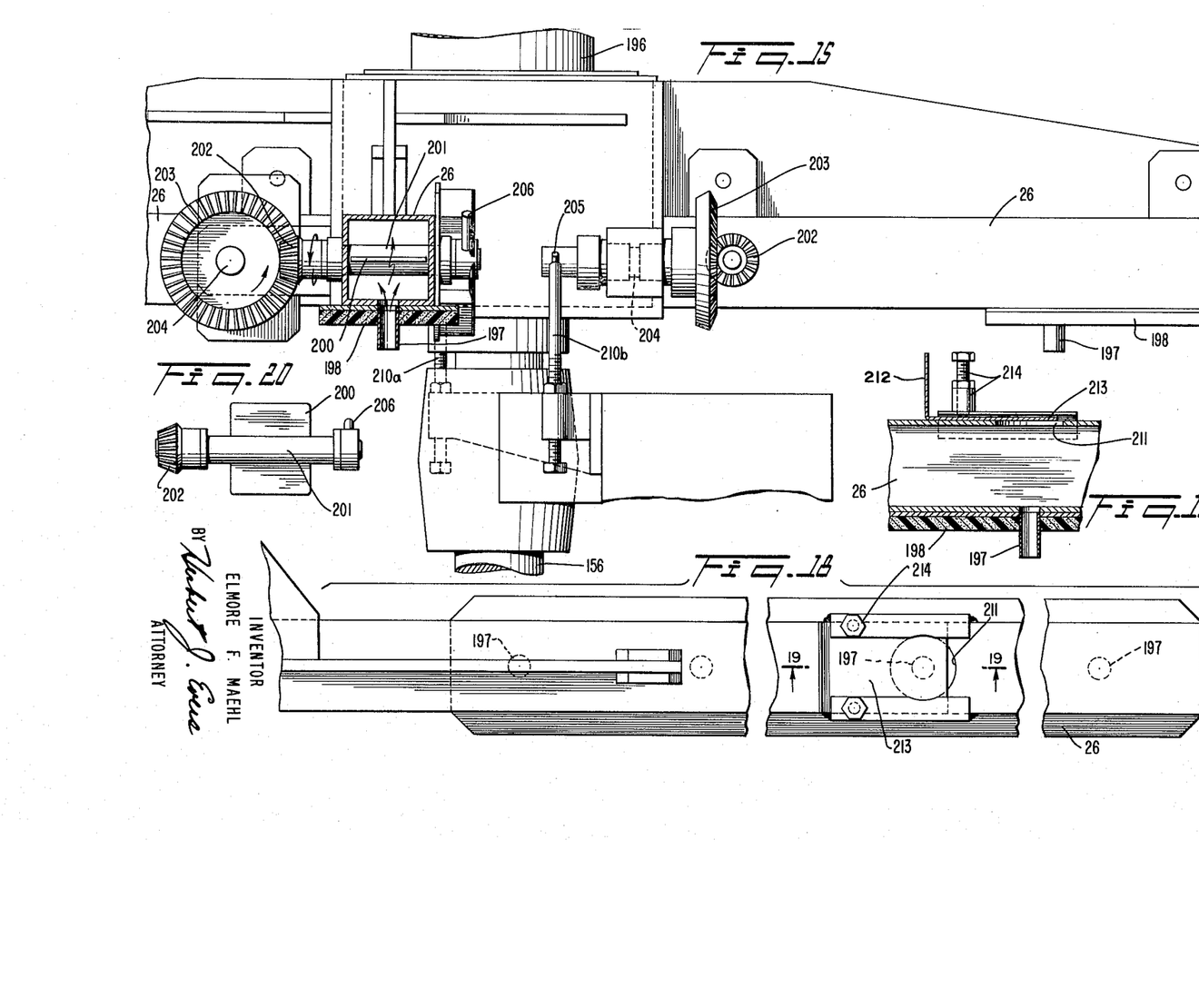
FIG. 15 is a sectional view taken along line 15—15 of FIG. 14, showing details of the cone transferring mechanism.
FIG. 20 is an enlarged detail of the gate valve controlling the vacuum conditions in the cone transfer arm.

It will be seen that when the transfer arm assembly drops down during the pause in the rotation thereof, a stationary operating pin 210a mounted on one side of the frame of the machine engages one of the projections 205a associated with the transfer arm 26a for picking up cones, see FIGS. 14, 16. At the same time, a similar operating pin 210b mounted on the opposite side of the frame of the machine engages one of the projections 205b associated with the transfer arm 26b for discharging cones, see FIGS. 14, 17. When this takes place, the stem 204 rotates to turn the gear and pinion 203, 202 to open the butterfly valve 200 in arm 26a and to close the butterfly valve 200 in arm 26b. Under these circumstances, the transfer arm 26a is open to air exhaustion through port opening 196, and the opposite transfer arm 26b is closed to further exhaustion. To prevent the butterfly valve 200 from swinging back while the transfer arm is in transit between the suction pick-up position and the cone release position, the locking arms 206 are lightly retained by the spring clips 207, 208.

It will be appreciated that the operating pins 210a and 210b are so located that the projection 205a engages the operating pin 210a on the cone pick-up side and the opposite projection 205b is engaged by pin 210b when it reaches the cone discharge side.

The fact that the closing of the butterfly valve 200 closes the transfer arm 26 to further exhaustion, does not necessarily mean the cones will be automatically released onto the conveyor band 27. In practice, the vacuum seal might be sufficiently tight to cause a slight lag in the release of the cones. In order, therefore, to overcome any disadvantage that might occur as a result of differences in degrees of seal, means are preferably provided for the instantaneous release of the cones if the butterfly valve is closed. This is accomplished by means of a vent opening 211, see FIG. 19, adjacent the end of each transfer arm of sufficient size to allow ingress of air once the butterfly valve is closed to quickly equalize the pressure inside and outside said transfer arm. Yet the vent opening 211 should not be large enough to affect the achievement of a slight negative pressure inside the transfer arm 26 once the butterfly valve 200 is opened. For this purpose, the vent opening 211 may be adjusted by a valve plate 212 which slides thereover and can be clampingly held in adjusted position by suitable clamp plates 213 and bolts 214.

*Drive for drying conveyor band*

Figure 21:
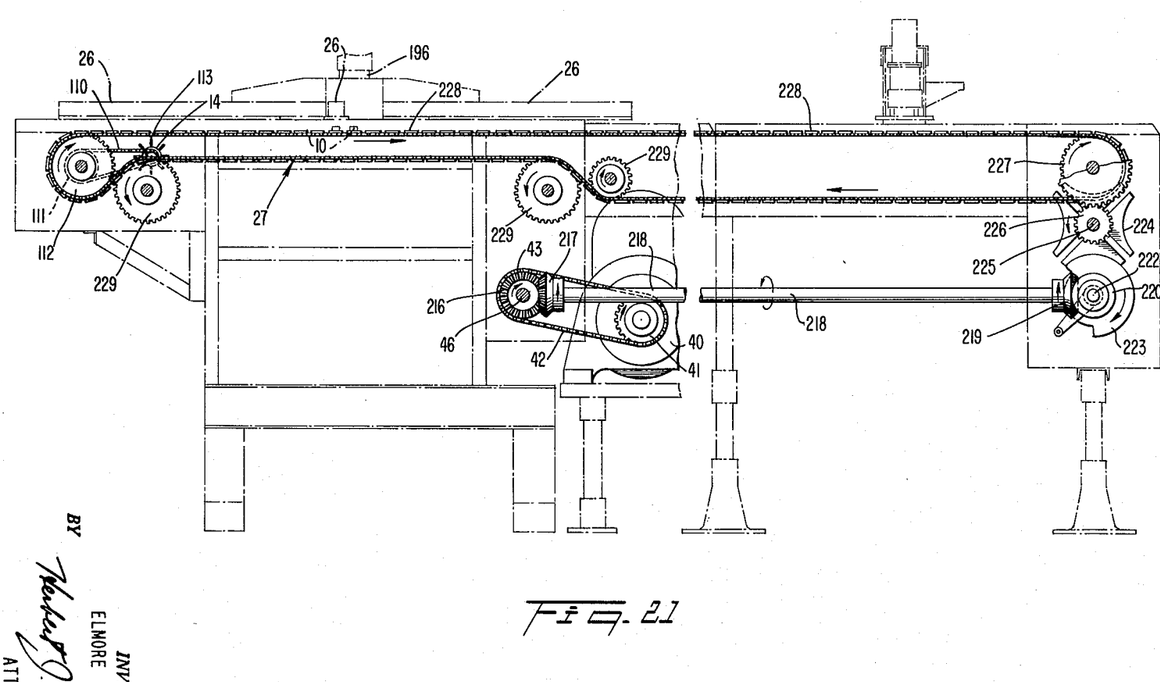
FIG. 21 shows diagrammatically the drive mechanism for the drying conveyor employed in the practice of the invention.

Referring to FIGS. 1, 3, and 21, the drying conveyor band 27 is driven from the rotating shaft 46 by means of a bevel gear 216 in mesh with a driven bevel gear 217 mounted at one end of a drive shaft 218. At the opposite end of the drive shaft 218 there is provided a pair of bevel gears 219–220 which transmit motion to a cylindrical bar 222 which in turn imparts motion to a continuously rotating element 223 of a Geneva coupling 223–224. This Geneva coupling is preferably constructed similar to the Geneva drive 167–170 previously described, although other constructions may be employed for the same purpose. In this manner, the continuous rotary motion of element 223 is transferred into intermittent rotary motion in the Geneva element 224.

The intermittently driven element 224 mounted on a shaft 225 rotates in unison with a sprocket 226 thereon which engages a forward drive sprocket 227 over which the drive chain 228 of the drying conveyor 27 is entrained. The entire drive is so proportioned that the drying conveyor 27 moves intermittently in synchronization with the intermittent movement of the cone drum 17 and the transfer arms 26. One or more idlers 229 serve to provide the necessary tension in the chain 228 and to guide such chains around moving machine parts.

It will be understood that modifications and variations may be effected without departing from the spirit and scope of the present invention.

I claim:

1. A machine for flavor coating cones comprising a cone holding cylinder, means for transferring a group of cones to a group of inwardly converging frustoconical sockets in said holding member at a first position thereof, cone retaining means coacting interiorly of said cone holding cylinder whereby a vacuum may be applied to the exterior surface of said cones to normally draw the latter within said sockets, gear means for axially rotating said group of cones while under said vacuum retention, means for intermittently rotating said cone holding cylinder for transferring said group of cones in sequence to a second position for adhesively spraying said cones, a third position for flavor spraying said cones, and a fourth position for ejecting said cones, and means at said fourth position for transferring said cones from said cone holding cylinder to a drying conveyor.

2. A machine according to claim 1, said means for transferring said cones from said cone holding cylinder to said drying conveyor, comprising a stripper for releasing said vacuum means to facilitate ejection of said cones from said cylinder, a vertically retractible transfer arm for laterally transferring a plurality of said ejected cones to said drying conveyor movable from an arm loading position adjacent said cylinder to a remote arm unloading position adjacent said drying conveyor, drive means for moving said transfer arm between said loading position and said unloading position, cam means for operating said stripper coupled to said cone holding cylinder for synchronous movement therewith, and reduced pressure means associated with said transfer arm for lifting a plurality of ejected cones from said cone holding cylinder, and means at said drying conveyor for releasing said reduced pressure.

3. Apparatus for the flavor coating of cones comprising a drum having a plurality of inwardly converging frustoconical sockets formed to receive cones, means for adhesively spraying the exterior rim area of the cones, means for flavor coating said areas on the adhesively sprayed cones, Geneva-controlled means for intermittently rotating the drum about a horizontal axis from a position where the drum faces infeed conveyor for the deposition in said sockets of a group of uncoated cones to a sequence of positions where said group of cones faces toward said adhesive spray means, and thereafter faces toward said flavor coating means, means for removing flavor coated cones from said drum and rotating them transversely therefrom about a vertical axis toward a drying conveyor, means for correlating the movement of the drum whereby during the stationary period of said drum there occurs simultaneously at different stations the deposition of cones into said sockets, the adhesive spraying of cones, the flavor coating of adhesively sprayed cones, and the removal of flavor coated cones to said drying conveyor, and means for forming a negative pressure seal between the cones and the drum.

4. Apparatus for flavor coating the exterior rim surface of edible cones, comprising a cone holding member, a conveyor arm adjacent said member for the deposition thereon of cones to be coated, an adhesive sprayer station disposed adjacent said member, a flavor spraying station disposed adjacent said member, means for moving said cone holder whereby cones deposited thereon are conveyed past said adhesive sprayer station and said flavor spraying station, said cone holding member being a substantially cylindrical drum having inwardly converging frustoconical shaped cone receiving recesses, said conveyor arm, adhesive sprayer station and flavor spraying station each being mounted at spaced intervals adjacent the periphery of said drum.

5. In an apparatus for flavor coating edible pastry cones comprising an elongated hollow drum, a plurality of radially-directed sockets enclosed within said drum arranged in transverse rows and spaced equally about said drum, each row of said sockets being adapted to nestingly receive a group of cones therein in such manner as to permit a portion thereof to extend outside said drum for flavor coating purposes applicable to the exterior rim area of said cones, means for introducing negative pressure inside said drum for retaining said cones, gear train means mounted for rotation on the exterior cylindrical surface of said drum for continuously rotating said cones while under the retentive influence of said negative pressure, and a Geneva mechanism remotely disposed from said drum for periodically rotating said drum and sequentially stopping said drum to index each transverse row of sockets at a series of stations, one of said stations being an adhesive spraying station, another of said stations being flavor spraying station, and another of said stations being a flavor coated cone removing station.

6. In an apparatus for flavor coating edible pastry cones according to claim 5, and means for synchronously operating each of said stations simultaneously each time one of said rows is stopped at a station.

7. In a cone cylinder according to claim 5, a row of depressible plungers in registration with a row of said cone sockets, camming means for depressing said plungers to facilitate ejection of each row of cones at said cone removing station, an enclosure for said gear train, the exterior surface of said drum forming part of said enclosure, an air valve axially disposed within said drum, an air inlet in said gear train enclosure communicating through the wall of said drum with said air valve, an air outlet in said gear train enclosure, a source of positive air pressure in communication with said air valve whereby a constant positive air flow is communicated to said enclosure and about said gear train to prevent ingress of loose foreign matter.

References Cited by the Examiner
UNITED STATES PATENTS

| | | | |
|---|---|---|---|
| 1,013,858 | 1/12 | Bucklin | 118—319 X |
| 2,103,270 | 12/37 | Murch | 118—314 |
| 2,203,572 | 6/40 | Johnson | 118—230 X |
| 2,330,880 | 10/43 | Gladfelter et al. | 118—319 X |
| 2,426,391 | 8/47 | Emerson | 118—320 X |
| 2,800,945 | 7/57 | Schilling | 156—567 X |
| 3,044,442 | 7/62 | Pott | 118—300 X |

FOREIGN PATENTS 470,312 12/50 Canada.

CHARLES A. WILLMUTH, *Primary Examiner.*
JOSEPH B. SPENCER, RICHARD D. NEVIUS,
*Examiners.*